United States Patent
Lemaitre et al.

(10) Patent No.: US 9,766,417 B2
(45) Date of Patent: Sep. 19, 2017

(54) METHOD FOR ALIGNING ELECTRO-OPTIC DEVICE WITH OPTICAL FIBER ARRAY WITH OPTICAL GRATING COUPLERS

(71) Applicant: STMICROELECTRONICS (CROLLES 2) SAS, Crolles (FR)

(72) Inventors: Patrick Lemaitre, Biviers (FR); Jean-Francois Carpentier, Grenoble (FR)

(73) Assignee: STMICROELECTRONICS (CROLLES 2) SAS, Crolles (FR)

( * ) Notice: Subject to any disclaimer, the term of this patent is extended or adjusted under 35 U.S.C. 154(b) by 0 days.

(21) Appl. No.: 15/350,901

(22) Filed: Nov. 14, 2016

(65) Prior Publication Data
US 2017/0059793 A1    Mar. 2, 2017

Related U.S. Application Data

(62) Division of application No. 14/755,437, filed on Jun. 30, 2015, now Pat. No. 9,529,165.

(51) Int. Cl.
| | |
|---|---|
| G02B 6/24 | (2006.01) |
| G02B 6/42 | (2006.01) |
| G02B 6/34 | (2006.01) |
| G02B 6/124 | (2006.01) |

(52) U.S. Cl.
CPC ........... *G02B 6/4225* (2013.01); *G02B 6/124* (2013.01); *G02B 6/34* (2013.01); *G02B 6/425* (2013.01); *G02B 6/4222* (2013.01); *G02B 6/4227* (2013.01)

(58) Field of Classification Search
CPC ...................................................... G02B 6/26
USPC ....................................................... 385/16, 37
See application file for complete search history.

(56) References Cited

U.S. PATENT DOCUMENTS

| | | | |
|---|---|---|---|
| 5,056,915 | A | 10/1991 | Curtis |
| 5,659,647 | A | 8/1997 | Kravitz et al. |
| 6,408,120 | B1 | 6/2002 | Dautartas |
| 6,754,428 | B1 | 6/2004 | Brown et al. |
| 6,819,858 | B2 | 11/2004 | Steinberg et al. |
| 6,947,147 | B2 | 9/2005 | Motamedi et al. |
| 7,024,066 | B1 | 4/2006 | Malendevich et al. |
| 7,183,759 | B1 | 2/2007 | Malendevich et al. |

(Continued)

OTHER PUBLICATIONS

Arnold et al., "Set the Pace on the Data Highway," Physics' Best, Apr. 2014, pp. 3-5 See Priority U.S. Appl. No. 14/755,437, filed Jun. 30, 2015.

(Continued)

*Primary Examiner* — Kaveh C Kianni
(74) *Attorney, Agent, or Firm* — Slater Matsil, LLP

(57) ABSTRACT

A method is for aligning an electro-optic device. The method may include initially positioning an optical fiber array adjacent to optical grating couplers, and actively aligning the optical fiber array relative to the optical grating couplers in a yaw direction and a roll direction to determine a yaw and roll alignment at a first operating wavelength. The method may include actively aligning the optical fiber array relative to optical grating couplers in an x direction and a y direction to determine a first x and y alignment at the first operating wavelength, determining a second operating wavelength, and actively aligning the optical fiber array again relative to the optical grating couplers in the x direction and y direction to determine a second x and y alignment at the second operating wavelength.

22 Claims, 7 Drawing Sheets

(56) References Cited

U.S. PATENT DOCUMENTS

| | | |
|---|---|---|
| 7,184,626 B1 | 2/2007 | Gunn, III et al. |
| 7,378,861 B1 | 5/2008 | Malendevich et al. |
| 7,460,983 B2 | 12/2008 | Pickerd et al. |
| 7,548,682 B2 | 6/2009 | Last et al. |
| 8,622,935 B1 | 1/2014 | Leo |
| 8,907,696 B2 | 12/2014 | Masuda |
| 2004/0165637 A1 | 8/2004 | Bullington et al. |
| 2004/0217268 A1 | 11/2004 | Tobiason et al. |
| 2005/0068539 A1 | 3/2005 | Tobiason |
| 2007/0276614 A1 | 11/2007 | Tan et al. |
| 2011/0026882 A1 | 2/2011 | Budd et al. |

OTHER PUBLICATIONS

Luxtera, "Hybrid Silicon Photonics for High-Speed Optical Interconnect," Jul. 2014, pp. 1-24 See Priority U.S. Appl. No. 14/755,437, filed Jun. 30, 2015.

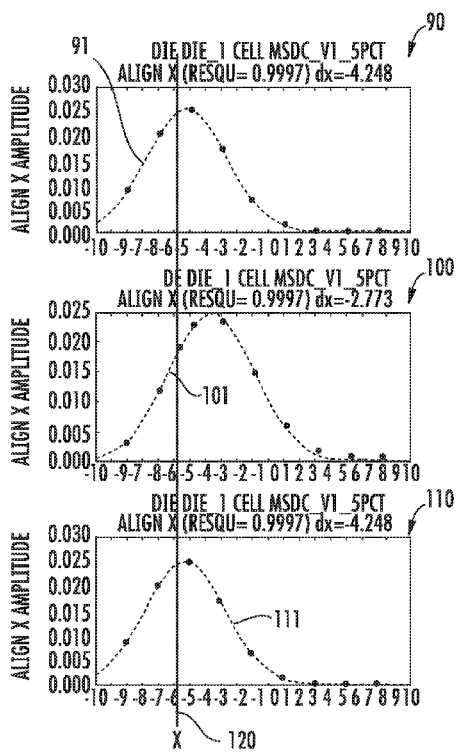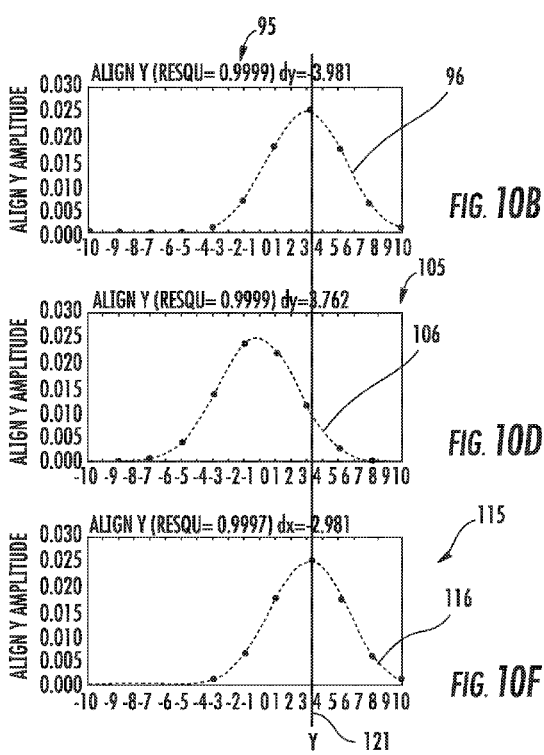

METHOD FOR ALIGNING ELECTRO-OPTIC DEVICE WITH OPTICAL FIBER ARRAY WITH OPTICAL GRATING COUPLERS

CROSS REFERENCE TO RELATED APPLICATIONS

This application is a divisional application of pending U.S. patent application Ser. No. 14/755,437 filed Jun. 30, 2015, which is hereby incorporated herein in its entirety by reference.

TECHNICAL FIELD

The present disclosure relates to the field of photonics, and, more particularly, to an electro-optic device and related methods.

BACKGROUND

Integrated optical devices for directly processing optical signals have become of greater importance as optical fiber communications increasingly replace metallic cable and microwave transmission links. Integrated optical devices can advantageously be implemented as silicon optical circuits having compact dimensions at relatively low cost. Silicon optical circuits employ integrated waveguide structures formed in a silicon layer of a silicon on insulator (SOI) substrates, to form a silicon photonic chip.

In some applications, the optical signal is injected in/extracted from the photonic chip in a near perpendicular fashion, with respect to the photonic chip substrate plane, by way of optical grating couplers formed in the silicon photonic chip for input-output of the photonic signal. When using the silicon substrate in such a coupling fashion, such as when coupling to an optical fiber, the optical fiber is mounted in near perpendicular fashion.

In certain applications, the optical fiber may comprise a plurality thereof arranged in an optical fiber array. The optical fiber array is aligned with optical grating couplers on the integrated optical device, i.e. each optical fiber is aligned with a respective optical grating coupler.

SUMMARY

Generally speaking, a method is for aligning an electro-optic device comprising a photonic chip having a plurality of optical grating couplers at a surface thereof, and an optical fiber array comprising a plurality of optical fibers (e.g. single mode optical fibers) and a body retaining proximal ends of the plurality of optical fibers in side-by-side relation. The method may include initially positioning the optical fiber array adjacent the plurality of optical grating couplers, and actively aligning the optical fiber array relative to the plurality of optical grating couplers in a yaw direction and a roll direction to determine a yaw and roll alignment at a first operating wavelength. The method may include actively aligning the optical fiber array relative to the plurality of optical grating couplers in an x direction and a y direction to determine a first x and y alignment at the first operating wavelength, and determining a second operating wavelength. The method may include actively aligning the optical fiber array again relative to the plurality of optical grating couplers in the x direction and y direction to determine a second x and y alignment at the second operating wavelength.

More specifically, actively aligning the optical fiber array relative to the plurality of optical grating couplers in the yaw direction and the roll direction may comprise coupling a plurality of photodiodes respectively to proximal ends of the plurality of optical fibers. Also, aligning the optical fiber array relative to the plurality of optical grating couplers in the yaw direction and the roll direction may comprise determining an optimum yaw and roll position based upon each optical fiber having a same threshold power.

In some embodiments, actively aligning the optical fiber array relative to the plurality of optical grating couplers in the x direction and the y direction may comprise launching an optical signal from a single optical grating coupler from the plurality thereof to a single photodiode. Actively aligning the optical fiber array relative to the plurality of optical grating couplers in the x direction and the y direction may comprise using an optical splitter coupled between the distal end of the optical fiber and the single photodiode.

Actively aligning the optical fiber array relative to the plurality of optical grating couplers in the x direction and the y direction may comprise launching an optical signal from an optical source to a single optical grating coupler from the plurality thereof. Determining the first x and y alignment at the first operating wavelength may comprise determining an optimum x and y alignment based upon a threshold average power through the plurality of optical grating couplers and the optical fiber array.

Additionally, the method may further comprise geometrically aligning the optical fiber array in a pitch direction. Determining the second operating wavelength may comprise determining an optimum wavelength based upon a threshold power through the plurality of optical grating couplers and the optical fiber array.

BRIEF DESCRIPTION OF THE DRAWINGS

FIGS. 10A-10F are diagrams showing power for each optical grating coupler during the x-y alignment in the method for aligning the electro-optic device, according to the present disclosure.

DETAILED DESCRIPTION

Figure 1:
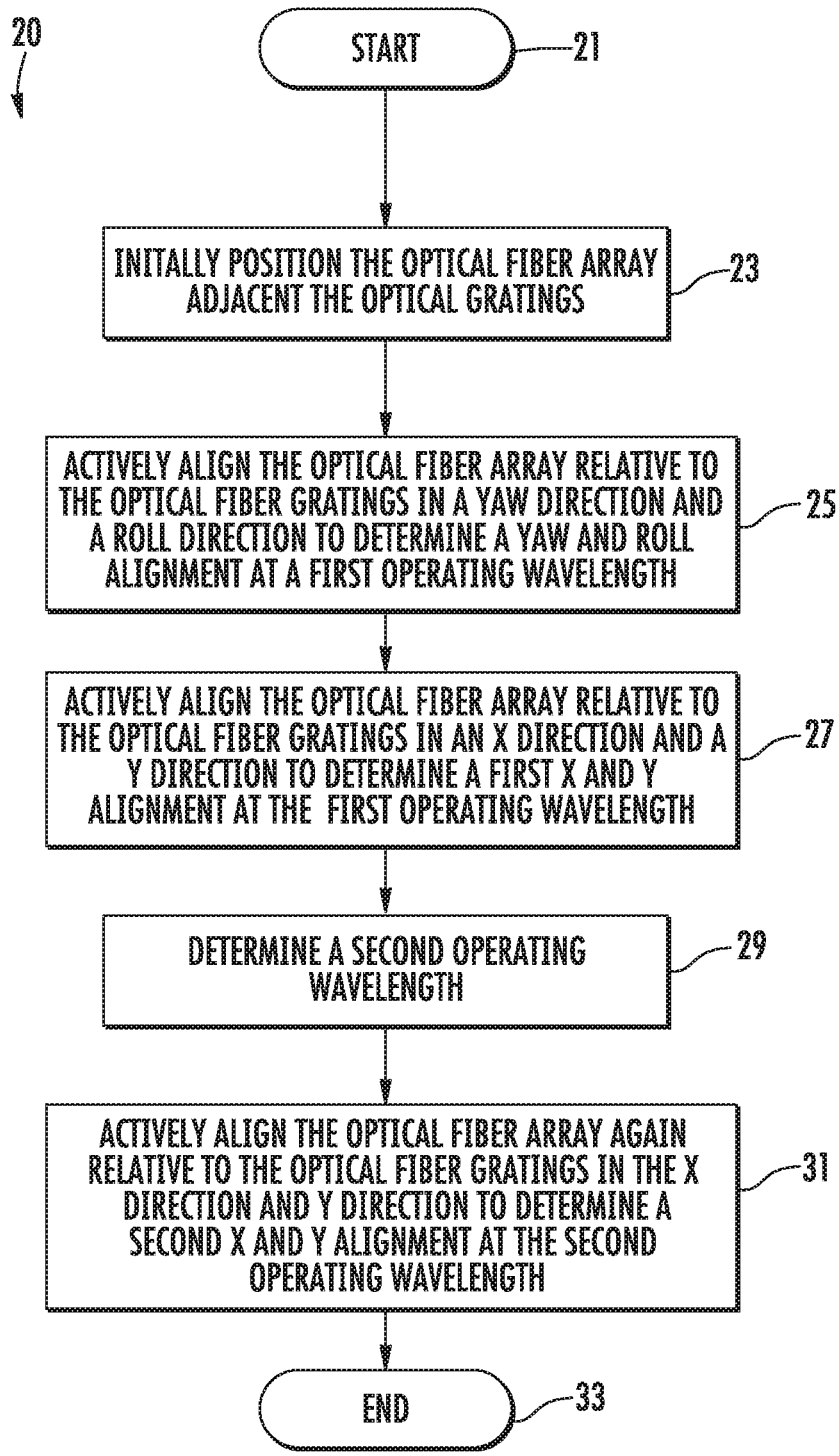
FIG. 1 is a flowchart illustrating operation of a method for aligning an electro-optic device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
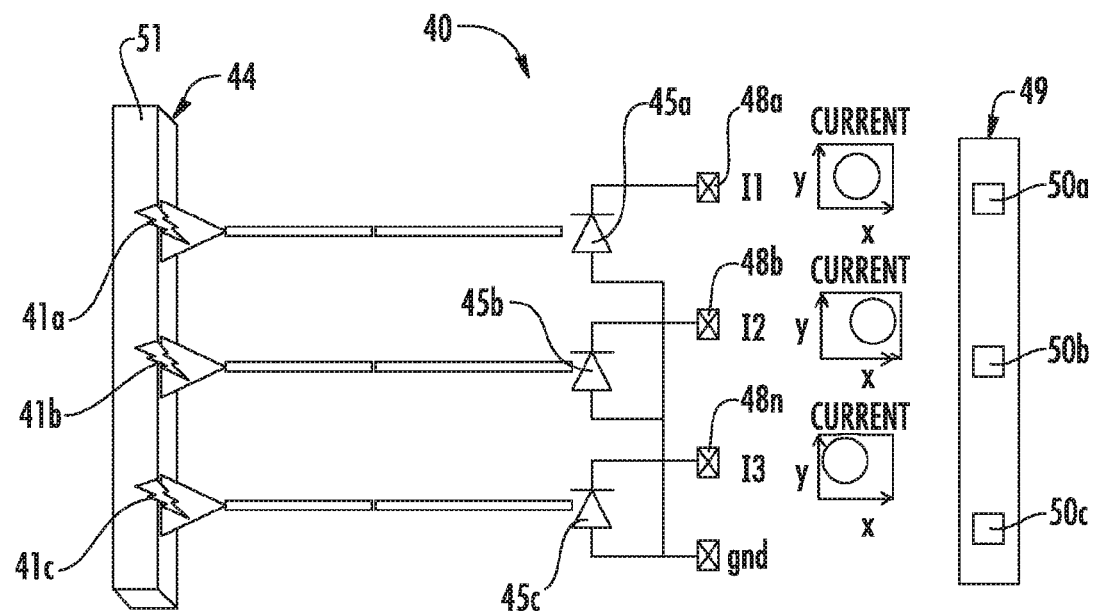
FIGS. 2-3 are schematic diagrams of example alignment embodiments for the electro-optic device, according to the present disclosure.
Figure 4:
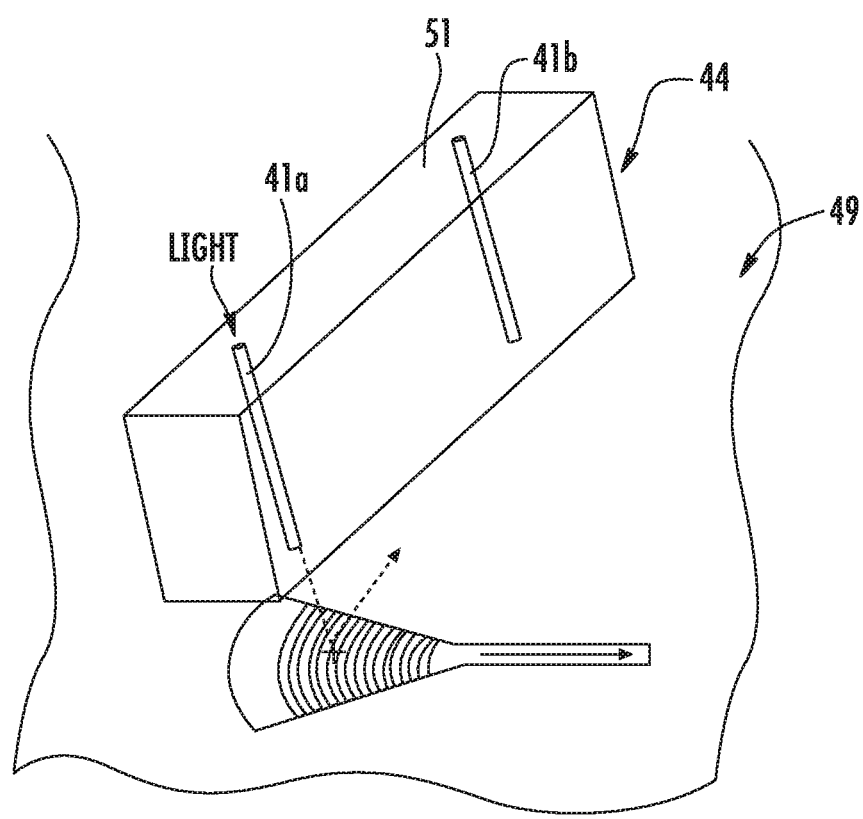
FIG. 4 is a schematic perspective view of an optical fiber being aligned with an optical grating coupler, according to the present disclosure.
Figure 5A:
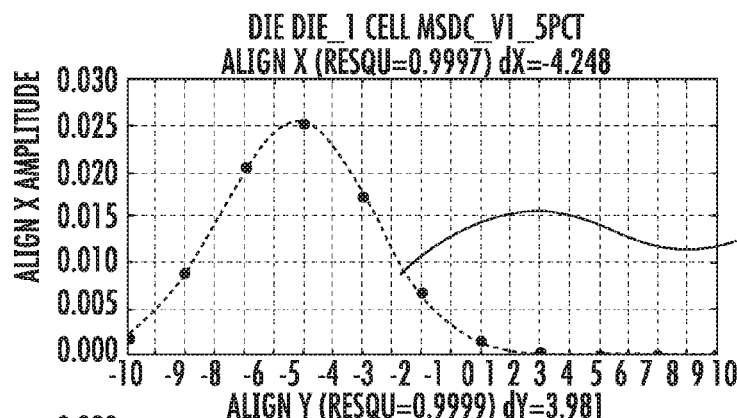
FIGS. 5A-5B are diagrams showing yaw alignment in the method for aligning an electro-optic device, according to the present disclosure.
Figure 5B:
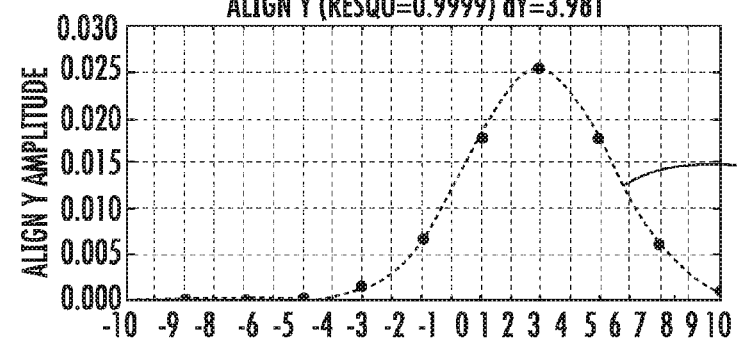
Figures 6A, 6B:
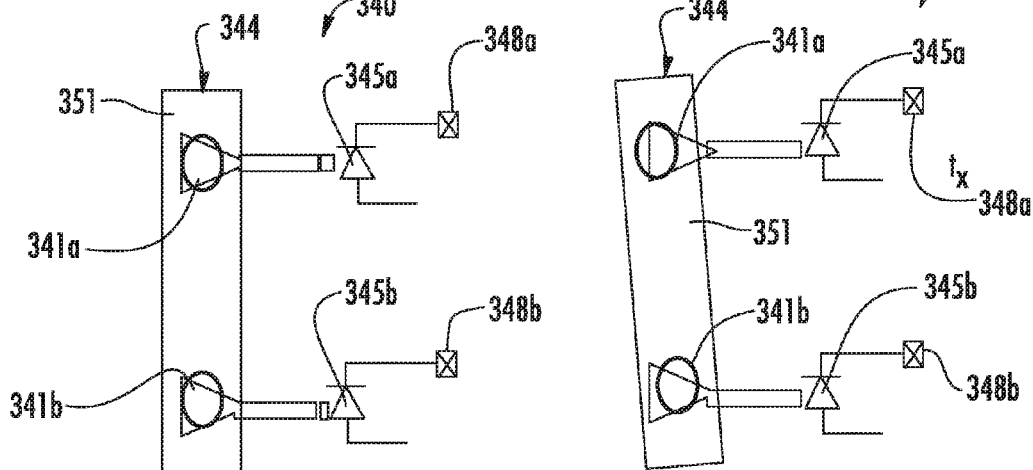
FIGS. 6A-6B are schematic diagrams respectively showing proper and improper yaw alignment in the method for aligning an electro-optic device, according to the present disclosure.
Figure 7A:
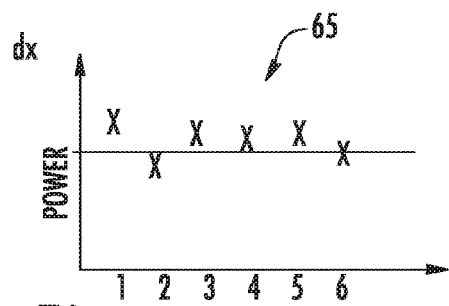
FIGS. 7A-7B are diagrams showing power for each optical grating coupler during the yaw alignment in the method for aligning an electro-optic device, according to the present disclosure.
Figure 7B:
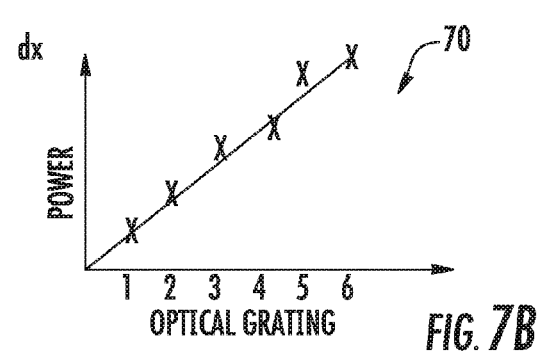

Referring initially to FIGS. 1-2 and 4, a method for aligning an electro-optic device 40 according to the present disclosure is now described with reference to a flowchart 20 (Block 21). The electro-optic device 40 illustratively includes a photonic chip 49 having a plurality of optical grating couplers 50a-50c at a surface thereof, and an optical fiber array 44 comprising a plurality of optical fibers 41a-41c (e.g. single mode optical fibers) and a body 51 retaining proximal ends of the plurality of optical fibers in side-by-side relation. The method illustratively includes initially positioning the optical fiber array 44 adjacent the plurality of optical grating couplers 50a-50c. (Block 23). It should be appreciated that although the illustrated embodiment includes three optical grating couplers 50a-50c and three optical fibers, the present disclosure can 41a-41c include more or even less optical grating couplers and optical fibers.

In typical approaches, the optical fiber array 44 would be aligned (i.e. x position, y position, pitch, yaw, and roll) as one entity. Since there is mismatch in alignment in adjacent optical fibers 41a-41c (i.e. the optical fibers are not aligned with each other in the optical fiber array) in the optical fiber array 44, this makes optimum alignment of all optical fibers quite difficult. In typical approaches, there may be some potential drawbacks, such as: optical fibers 41a-41c not always being aligned (due to fiber array); roll, yaw misalignment; no knowledge of whether the output is not properly aligned, or input, or both; and in a multiple optical grating couplers, the user cannot know if all of the optical grating couplers 50a-50c are aligned.

The method illustratively includes actively aligning the optical fiber array 44 relative to the plurality of optical grating couplers 50a-50c in a yaw direction and a roll direction to determine a yaw and roll alignment at a first operating wavelength. (Block 25). In the present disclosure, by active alignment, it is meant that the electro-optic device 40 is activated with an optical source and then aligned based upon detected transmitted power, i.e. feedback. For example, the optical fiber array 44 may be mounted onto a 5-axis probe support device, as available from Thorlabs, Inc. of Newton, N.J.

More specifically, actively aligning the optical fiber array 44 relative to the plurality of optical grating couplers 50a- 50c in the yaw direction and the roll direction may comprise coupling a plurality of photodiodes 45a-45c respectively to proximal ends of the plurality of optical fibers 41a-41c. The plurality of photodiodes 45a-45c is respectively coupled to a plurality of output nodes 48a-48c. Also, aligning the optical fiber array 44 relative to the plurality of optical grating couplers 50a-50c in the yaw direction and the roll direction may comprise determining an optimum yaw and roll position based upon each optical fiber 41a-41c having a same threshold power (i.e. each optical fiber providing a minimum threshold power output). Additionally, the method illustratively includes geometrically aligning the optical fiber array 44 in a pitch direction, i.e. the optical fiber array is spatially oriented without optical/active feedback.

The method illustratively includes actively aligning the optical fiber array 44 relative to the plurality of optical grating couplers 50a-50c in an x direction and a y direction to determine a first x and y alignment at the first operating wavelength. (Block 27). Determining the first x and y alignment at the first operating wavelength may comprise determining an optimum x and y alignment based upon a threshold average power through the plurality of optical grating couplers 50a-50c and the optical fiber array 44.

The method illustratively includes determining a second operating wavelength. (Block 29). The second operating wavelength is the wavelength that maximizes the power output at the first x and y alignment. Thus, the spectra should be measured (it is a polynomial function, close to a parabola), and a wavelength corresponding to the maximum output power is found. This is the reference lambda. Determining the second operating wavelength may comprise determining an optimum wavelength based upon a threshold power passing through the plurality of optical grating couplers 50a-50c and the optical fiber array 44. In some embodiments, the optical source powering the active alignment is swept across a frequency range, and the optical source transmits peak power through the electro-optic device 40 at the second operating wavelength.

The method illustratively includes actively aligning the optical fiber array 44 again relative to the plurality of optical grating couplers 50a-50c in the x direction and y direction to determine a second x and y alignment at the second operating wavelength. (Blocks 31, 33). Here, the second x and y alignment provides peak transmitted power through the electro-optic device 40 at the second operating (i.e. optimum) wavelength. In other embodiments, another step can be added to the method. This additional step would comprise measuring the full spectra at each X, Y for each optical grating coupler.

For example, in one approach to alignment, the sum of the normalized current from each of the plurality of output nodes 48a-48c can be used for alignment. Advantageously, to determine the optimum alignment for the electro-optic device 40, the user can discriminate between outputs and inputs of the photonic chip 49. Also, the user can determine the alignment of each optical grating coupler 50a-50c. The user can also find the optimum alignment for a single optical grating coupler 50a-50c, and can compensate for the misalignment of the optical fiber array 44.

Referring now to FIGS. 5A-7B, another embodiment of the electro-optic device 340 is now described. In this embodiment of the electro-optic device 340, those elements already discussed above with respect to FIGS. 1-2 are incremented by 300 and most require no further discussion herein. Here, actively aligning of the optical fiber array 344 relative to the plurality of optical grating couplers (not shown) in a yaw direction is described in detail. Diagram 60 illustratively includes a curve 61 showing power output for each optical grating coupler as the x position is varied. Also, diagram 62 illustratively includes a curve 63 showing power output for each optical grating coupler as the y position is varied. In FIG. 6A, the yaw alignment of the optical fiber array 344 is proper while FIG. 6B shows improper alignment. Diagrams 65, 70 show respective power output for each optical grating coupler with proper alignment (i.e. the power level for each optical grating coupler is near constant) and improper alignment (i.e. the power level for each optical grating coupler is linear and non-constant).

Figure 8A:
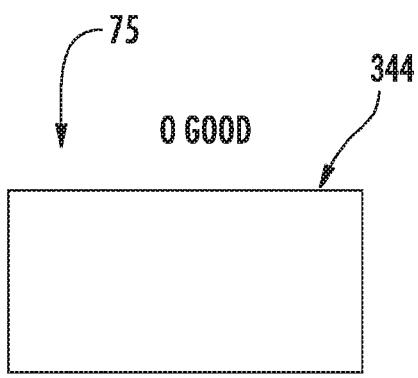
FIGS. 8A-8B are schematic diagrams respectively showing proper and improper roll alignment in the method for aligning an electro-optic device, according to the present disclosure.
Figure 8B:
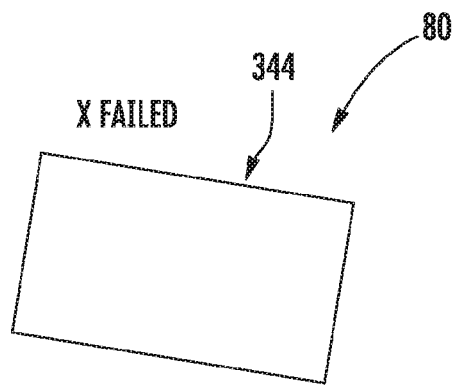
Figure 9A:
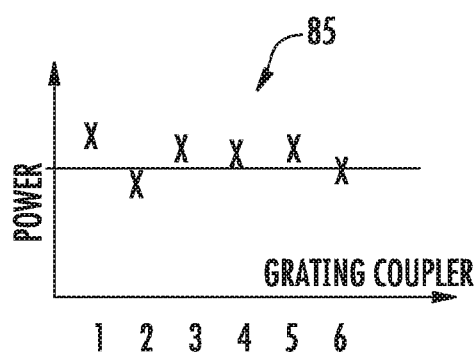
FIGS. 9A-9B are diagrams showing power for each optical grating coupler during the roll alignment in the method for aligning an electro-optic device, according to the present disclosure.
Figure 9B:
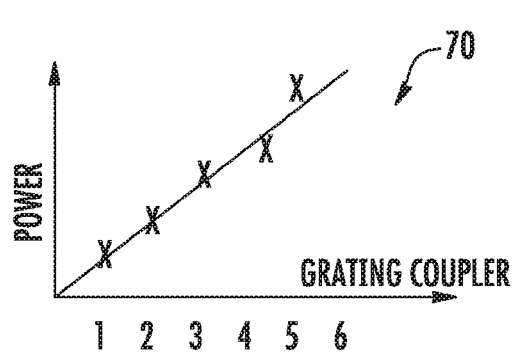

Referring now to FIGS. 8A-9B, actively aligning of the optical fiber array 344 relative to the plurality of optical grating couplers (not shown) in a roll direction is described in detail. In FIG. 8A, diagram 75, the roll alignment of the optical fiber array 344 is proper while FIG. 8B, diagram 80, shows improper alignment. Diagrams 85, 90 show respective power output for each optical grating coupler with proper alignment (i.e. the power level for each optical grating coupler is near constant) and poor alignment (i.e. the power level for each optical grating coupler is linear and non-constant).

Referring now to FIGS. 10A-10F, actively aligning of the optical fiber array 44 relative to the plurality of optical grating couplers 50a-50c in the x direction and the y direction to determine the first x and y alignment at the first operating wavelength is now described in detail. Here, diagrams 90, 100, 110 illustratively include curves 91, 101, 111, respectively, which show power output for each optical grating coupler as the x position is varied. Also, diagrams 95, 105, 115 illustratively include curves 96, 106, 116, respectively, showing power output for each optical grating coupler as the y position is varied. In this step, the method endeavors to provide the peak average power for each optical fiber 41a-41c. The optimum x position is at line 120, and the optimum y position is at line 121.

Knowing the power in function of the absolute position X, Y of the optical fiber array 44, it is possible to find a position that will be the most suitable for the need of a particular circuit or device under test (DUT). Mathematically, that can take the form of maximizing a merit function F(X,Y). For each optical grating coupler, at a reference lambda, the user can measure using the electro-optic circuit presented, the power in function of X,Y Pi=gi(X,Y), which is known as being a Gaussian function:

$$gi(X,Y)=Ai*\exp(-(X-Xi)^2/2\sigma xi-(Y-Yi)^2/2\sigma yi);$$

where Ai is the amplitude, σxi & σyi are the spread in x and y, Xi, Yi is the center of gi, and optimum position X,Y of the grating coupler i at reference lambda.

Here, an example is provided: if the purpose is to maximize to input power:

$$F(X,Y)=g1(X,Y);$$

if the purpose is to maximize to power flowing from the input 1 to the outputs 2 and 3: F(X,Y)=g1(X,Y)+g2(X,Y))+g3(X,Y); and if the purpose is to have the best repartition of power between outputs 2 and 3 (useful to measure optically the splitting ratio of a splitter), then the optimization would be: F(X,Y)=1/g2(X,Y)−g3(X,Y)). It should be noted that F is also dependent of the wavelength lambda λ, so F becomes F(X,Y, λ).

In the next step, the results for power output for each optical grating coupler 50a-50c are fixed to get a true answer for the DUT. The electro optical circuit 40 of FIG. 2 should first be measured: at each X, Y, at a reference lambda, The current in the photodiode i 45a-45c associated to the optical grating coupler I 50a-50c is measured on a range of X,Y. The Gaussian function gi(X,Y) as a function of the position of the grating X,Y is deduced for each grating, by fitting a Gaussian function on the value measured. Xi, Yi is the optimum position of the Gaussian function at reference lambda.

If full spectra (in function of lambda) is necessary, for each X,Y, the current of the photodiode in function of lambda is measured. Xi, Yi is still the optimum position of the Gaussian function at reference lambda. In this case, the Gaussian function becomes also a function of lambda: gi(X,Y, lambda), in which the amplitude Ai is a function of lambda.

Figure 3:
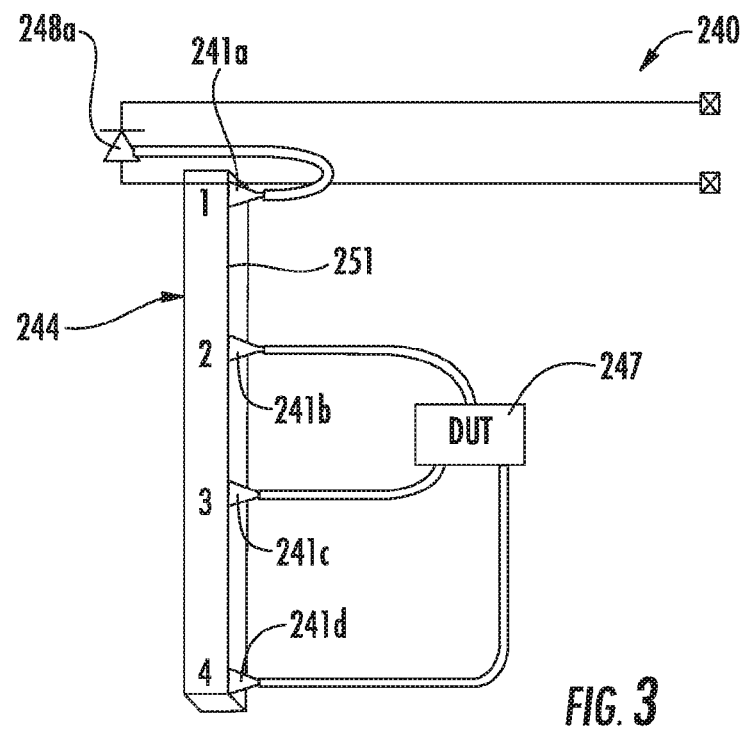

Then, in the circuit containing the DUT 247, at least one of the grating should be connected to a photodiode (FIG. 3) The user then places the optical fiber array 244 at the optimum position, at reference lambda, for the grating connected to the photodiode, for instance the grating 1 X,Y=X1, Y1. In FIG. 3, the first input (1) is connected to a photodiode 248a, the one DUT 247 is coupled with one input (2), and two outputs (3, 4).

Thus, now the user can deduct from the power measurement Pi at output i what would be the output power if the optical fiber array 244 where placed at the optimum value Xi, Yi. Pmi represents the measured power at output I, and Pci represents the corrected value at output i.

Measure:

$$Pmi=Pi \text{ at } X,Y$$

$$Pmi=T*gi(X,Y)$$

$$Pmi=T*gi(X,Y)$$

$$\rightarrow T=Pmi/gi(X,Y)$$

T represents the responsiveness of the photodiode multiplied by the transfer function of the DUT (T=R*H). T does only depend on the DUT (i.e. not the X,Y position).

Corrected Value:

$$Pci=Pi(Xi,Yi)$$

$$Pci=T*gi(Xi,Yi)$$

$$\rightarrow Pci=Pmi*gi(Xi,Yi)/gi(X,Y)$$

Thus, using this method, the user can measure the insertion loss of a DUT without being impacted by the inaccuracy in the optical fiber array position. For example: the insertion loss of a device between input 2 and output 3 is given by: Loss=Pc3/Pc2; where Pc3 is the corrected power value at output 3, Pc2 is the corrected power value at output 2. The splitting ratio of a splitter device between input 2 and output 3 and 4 is given by: k=Pc4/(Pc3+Pc2); and where Pc4 is the corrected power value at output 4, Pc3 is the corrected power value at output 3, Pc2 is the corrected power value at output 2.

If full spectra (in function of lambda) is necessary, the method is modified as follows: for each, lambda is corrected the value measured by using gi(X,Y) measured at lambda. For each lambda Measure:

$$Pmi(\text{lambda})=Pi \text{ at } X,Y$$

$$Pmi(\text{lambda})=T(\text{lambda})*gi(X,Y,\text{lambda})$$

$$\rightarrow T(\text{lambda})=Pmi(\text{lambda})/gi(X,Y,\text{lambda})$$

Figure 11:
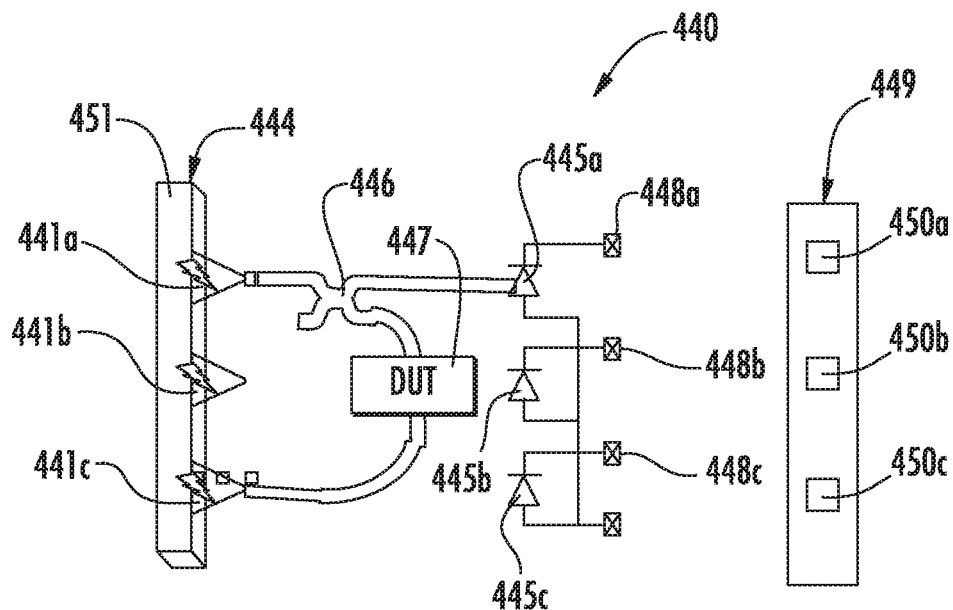
FIG. 11 is a schematic diagram of another example alignment embodiment for the electro-optic device, according to the present disclosure.

Corrected Value:

$Pci = Pi$ at $Xi, Yi$ $Pci = T*gi(Xi, Yi, \text{lambda})$ $Pci(\text{lambda}) = Pmi(\text{lambda}) * gi(Xi, Yi, \text{lambda}) / gi(X, Y, \text{lambda})$ Referring now additionally to FIG. 11, another embodiment of the electro-optic device 440 is now described. In this embodiment of the electro-optic device 440, those elements already discussed above with respect to FIGS. 1-2 are incremented by 400 and most require no further discussion herein. This embodiment differs from the previous embodiment in that this electro-optic device 440 illustratively includes actively aligning the optical fiber array 444 relative to the plurality of optical grating couplers in the x direction and the y direction comprising using an optical splitter 446 coupled between the distal end of the optical fiber 441a-441c and the single photodiode 445a. Here, actively aligning the optical fiber array 444 relative to the plurality of optical grating couplers 450a-450c in the x direction and the y direction may comprise launching an optical signal from a single optical grating coupler 450a from the plurality thereof to a single photodiode 445a and through a DUT 447.

For the DUT measurement, the method uses the circuit presented in FIG. 11 in order to place the fiber array at the optimum position for the input grating 1 (450a). A coupler 446 is used to divide the light. One part is flowing through the photodiode 445a. The current is measured, and the optimum X1, Y1 is found. Then, the method described hereinabove applies.

Figure 12:
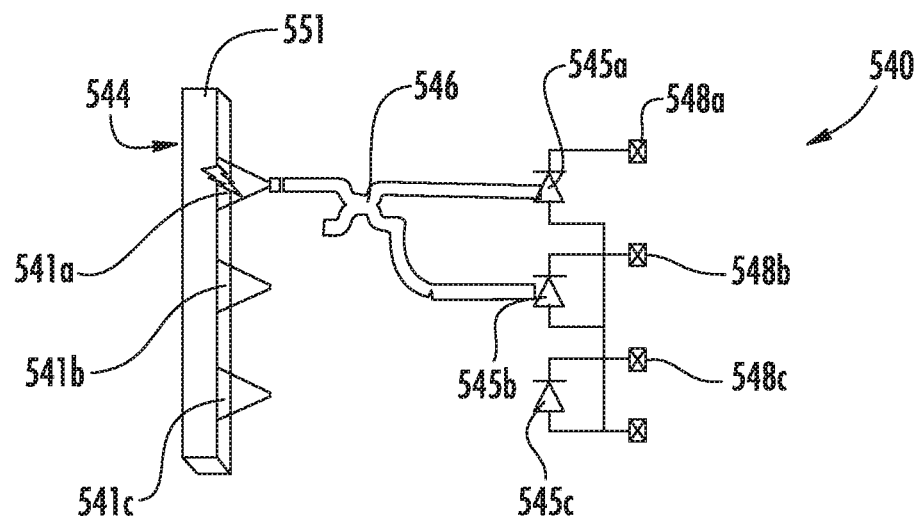
FIG. 12 is a schematic diagram of another example alignment embodiment for the electro-optic device, according to the present disclosure.

However, in order to know the real insertion loss of the DUT, the splitting coefficient kref of the coupler 446 should be measured separately, which can be done using the circuit 540 of FIG. 12. Here, the fiber array is positioned at an optimum position for grating 1: X1,Y1 for grating 1 is chosen. Then current in both photodiode is measured. Kref is Kref1=I1/(I1+I2).

Compared to the approach described hereinabove, it has the advantage of using the same number of grating than the one strictly needed for the DUT measurement. Using example of previous FIG. 11, the insertion loss of a device between input 1 and output 2 is given by: Loss=Pc2/(kref*Pc1). The splitting ratio of a splitter device between input 1 and outputs 2 and 3 is given by: k=Pc3/(Pc3+kref Pc2).

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A method for aligning an electro-optic device comprising a photonic chip having a plurality of optical grating couplers at a surface of the photonic chip, and an optical fiber array comprising a plurality of single mode optical fibers and a body retaining proximal ends of the plurality of single mode optical fibers in side-by-side relation, the method comprising: initially positioning the optical fiber array adjacent the plurality of optical grating couplers; actively aligning the optical fiber array relative to the plurality of optical grating couplers in a yaw direction and a roll direction to determine a yaw and roll alignment at a first operating wavelength, the actively aligning comprising coupling a plurality of photodiodes respectively to proximal ends of the plurality of single mode optical fibers, and determining an optimum a yaw and roll position based upon each single mode optical fiber having a same threshold power; actively aligning the optical fiber array relative to the plurality of optical grating couplers in an x direction and a y direction to determine a first x and y alignment at the first operating wavelength; determining a second operating wavelength by determining a peak power transmission value and associated peak power wavelength based upon a spectral sweep, the peak power wavelength defining the second operation wavelength; and actively aligning the optical fiber array again relative to the plurality of optical grating couplers in the x direction and y direction to determine a second x and y alignment at the second operating wavelength.

2. The method of claim 1 wherein actively aligning the optical fiber array relative to the plurality of optical grating couplers in the x direction and the y direction comprises launching an optical signal from a single optical grating coupler from the plurality of the optical grating couplers to a single photodiode.

3. The method of claim 2 wherein actively aligning the optical fiber array relative to the plurality of optical grating couplers in the x direction and the y direction comprises using an optical splitter coupled between the distal end of a single mode optical fiber and the single photodiode.

4. The method of claim 1 wherein actively aligning the optical fiber array relative to the plurality of optical grating couplers in the x direction and the y direction comprises launching an optical signal from an optical source to a single optical grating coupler from the plurality of optical grating couplers.

5. The method of claim 1 further comprising geometrically aligning the optical fiber array in a pitch direction.

6. The method of claim 1 wherein determining the second operating wavelength comprises determining an optimum wavelength based upon a threshold power through the plurality of optical grating couplers and the optical fiber array.

7. The method of claim 1 further comprising activating an optical source coupled to the optical fiber array before the actively aligning of the optical fiber array relative to the plurality of optical grating couplers in the yaw direction and the roll direction.

8. The method of claim 1 wherein at least some of the adjacent optical fibers of the plurality of optical fibers have alignment mismatch.

9. The method of claim 1 further comprising mounting the optical fiber array onto a 5-axis probe support device.

10. A method for aligning an electro-optic device comprising a photonic chip having a plurality of optical grating couplers at a surface of the photonic chip, and an optical fiber array comprising a plurality of single mode optical fibers and a body retaining proximal ends of the plurality of optical fibers in side-by-side relation, the method comprising: actively aligning the optical fiber array relative to the plurality of optical grating couplers in a yaw direction and a roll direction to determine a yaw and roll alignment at a first operating wavelength, the actively aligning comprising coupling a plurality of photodiodes respectively to proximal ends of the plurality of single mode optical fibers, and determining a desired yaw and roll position based upon each optical fiber having a same threshold power; actively aligning the optical fiber array relative to the plurality of optical grating couplers in an x direction and a y direction to determine a first x and y alignment at the first operating wavelength; determining a second operating wavelength by determining a peak power transmission value and associated peak power wavelength based upon a spectral sweep, the peak power wavelength defining the second operation wavelength; and actively aligning the optical fiber array again relative to the plurality of optical grating couplers in the x direction and y direction to determine a second x and y alignment at the second operating wavelength.

11. The method of claim 10 wherein actively aligning the optical fiber array relative to the plurality of optical grating couplers in the x direction and the y direction comprises launching an optical signal from a single optical grating coupler from the plurality of the optical grating couplers to a single photodiode.

12. The method of claim 11 wherein actively aligning the optical fiber array relative to the plurality of optical grating couplers in the x direction and the y direction comprises using an optical splitter coupled between the distal end of an optical fiber and the single photodiode.

13. The method of claim 10 wherein actively aligning the optical fiber array relative to the plurality of optical grating couplers in the x direction and the y direction comprises launching an optical signal from an optical source to a single optical grating coupler from the plurality of optical grating couplers.

14. The method of claim 10 further comprising geometrically aligning the optical fiber array in a pitch direction.

15. The method of claim 10 wherein determining the second operating wavelength comprises determining an optimum wavelength based upon a threshold power through the plurality of optical grating couplers and the optical fiber array.

16. The method of claim 10 further comprising activating an optical source coupled to the optical fiber array before the actively aligning of the optical fiber array relative to the plurality of optical grating couplers in the yaw direction and the roll direction.

17. The method of claim 10 wherein at least some of the adjacent optical fibers of the plurality of optical fibers have alignment mismatch.

18. The method of claim 10 further comprising mounting the optical fiber array onto a 5-axis probe support device.

19. A method for aligning an electro-optic device comprising a photonic chip having a plurality of optical grating couplers at a surface of the photonic chip, and an optical fiber array comprising a plurality of single mode optical fibers and a body retaining proximal ends of the plurality of optical fibers in side-by-side relation, the method comprising:

actively aligning the optical fiber array relative to the plurality of optical grating couplers in a yaw direction and a roll direction to determine a yaw and roll alignment at a first operating wavelength, the actively aligning comprising coupling a plurality of photodiodes respectively to proximal ends of the plurality of single mode optical fibers, and determining a desired yaw and roll position based upon each optical fiber having a same threshold power;

actively aligning the optical fiber array relative to the plurality of optical grating couplers in an x direction and a y direction to determine a first x and y alignment at the first operating wavelength;

determining a second operating wavelength by determining a peak power transmission value and associated peak power wavelength based upon a spectral sweep, the peak power wavelength defining the second operation wavelength;

actively aligning the optical fiber array again relative to the plurality of optical grating couplers in the x direction and y direction to determine a second x and y alignment at the second operating wavelength; and geometrically aligning the optical fiber array in a pitch direction.

20. The method of claim 19 wherein actively aligning the optical fiber array relative to the plurality of optical grating couplers in the x direction and the y direction comprises launching an optical signal from a single optical grating coupler from the plurality of the optical grating couplers to a single photodiode.

21. The method of claim 19 wherein actively aligning the optical fiber array relative to the plurality of optical grating couplers in the x direction and the y direction comprises launching an optical signal from an optical source to a single optical grating coupler from the plurality of optical grating couplers.

22. The method of claim 19 further comprising mounting the optical fiber array onto a 5-axis probe support device.

* * * * *